United States Patent
Karve et al.

(10) Patent No.: US 12,487,859 B2
(45) Date of Patent: Dec. 2, 2025

(54) PREVENTION OF RESOURCE STARVATION ACROSS STAGES AND/OR PIPELINES IN COMPUTER ENVIRONMENTS

(71) Applicant: International Business Machines Corporation, Armonk, NY (US)

(72) Inventors: Alexei Karve, Mohegan Lake, NY (US); Maroun Touma, Redding, CT (US); Sekou Lionel Remy, Nairobi (KE); Kugamoorthy Gajananan, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 18/098,026

(22) Filed: Jan. 17, 2023

(65) Prior Publication Data
US 2024/0241757 A1    Jul. 18, 2024

(51) Int. Cl.
   *G06F 9/50*    (2006.01)
   *G06F 9/48*    (2006.01)
   *G06F 9/52*    (2006.01)

(52) U.S. Cl.
   CPC .......... *G06F 9/5038* (2013.01); *G06F 9/4881* (2013.01); *G06F 9/524* (2013.01)

(58) Field of Classification Search
   None
   See application file for complete search history.

(56) References Cited

U.S. PATENT DOCUMENTS

| | | | | |
|---|---|---|---|---|
| 6,029,204 A * | 2/2000 | Arimilli | .................... | G06F 9/52 709/200 |
| 6,462,743 B1 * | 10/2002 | Battle | .................... | G06T 1/20 345/506 |
| 6,651,158 B2 * | 11/2003 | Burns | .................... | G06F 9/4881 712/205 |
| 6,717,576 B1 * | 4/2004 | Duluk, Jr. | .................... | G06T 11/40 345/506 |

(Continued)

FOREIGN PATENT DOCUMENTS

WO    2019226652 A1    11/2019

OTHER PUBLICATIONS

Gari et al., "Reinforcement Learning-based Application Autoscaling in the Cloud: A Survey," arXiv, 2020, 40 pages, retrieved from https://arxiv.org/abs/2001.09957.

(Continued)

*Primary Examiner* — Adam Lee
(74) *Attorney, Agent, or Firm* — Zilka-Kotab, P.C.

(57) ABSTRACT

A computer-implemented method, in accordance with one aspect of the present invention, includes analyzing timing data for stages in a pipeline running in an edge system for detecting starvation of one or more of the stages in the pipeline. In response to detecting one or more of the stages being starved, starvation avoidance is performed for mitigating the starvation of the starving stage(s). A computer-implemented method, in accordance with another aspect of the present invention, includes analyzing timing data for pipelines running in parallel in an edge system for detecting starvation of one or more of the pipelines. In response to detecting one or more of the pipelines being starved, starvation avoidance is performed for mitigating the starvation of the starving pipeline(s).

20 Claims, 13 Drawing Sheets

(56) References Cited

U.S. PATENT DOCUMENTS

| | | | | |
|---|---|---|---|---|
| 7,215,339 | B1* | 5/2007 | Dotson | G09G 5/363 345/506 |
| 7,836,448 | B1* | 11/2010 | Farizon | G06F 9/4843 709/225 |
| 8,108,872 | B1* | 1/2012 | Lindholm | G06F 9/5016 718/104 |
| 8,407,674 | B2 | 3/2013 | Krauss | |
| 8,667,492 | B2 | 3/2014 | Fortsch et al. | |
| 8,943,379 | B2 | 1/2015 | Vash et al. | |
| 9,128,754 | B2 | 9/2015 | Shankar et al. | |
| 9,304,922 | B2 | 4/2016 | Vash et al. | |
| 9,621,141 | B1* | 4/2017 | Yang | H03L 7/089 |
| 9,639,396 | B2 | 5/2017 | Pho et al. | |
| 10,719,245 | B1* | 7/2020 | Gudipati | G06F 3/0665 |
| 2004/0128461 | A1* | 7/2004 | DeSota | G06F 11/004 714/E11.144 |
| 2004/0128477 | A1* | 7/2004 | Henry | G06F 9/30145 712/245 |
| 2004/0216103 | A1 | 10/2004 | Burky et al. | |
| 2006/0064695 | A1* | 3/2006 | Burns | G06F 9/38 718/100 |
| 2006/0066623 | A1* | 3/2006 | Bowen | G06F 9/3851 345/506 |
| 2008/0016323 | A1* | 1/2008 | Henry | G06F 9/267 712/208 |
| 2008/0313639 | A1 | 12/2008 | Kumar et al. | |
| 2010/0049958 | A1* | 2/2010 | Vaskevich | G06F 9/325 712/241 |
| 2010/0091880 | A1* | 4/2010 | Jia | H04N 19/44 375/240.25 |
| 2010/0299499 | A1* | 11/2010 | Golla | G06F 9/3885 712/206 |
| 2011/0035751 | A1* | 2/2011 | Krishnakumar | G06F 9/4881 718/103 |
| 2015/0128142 | A1* | 5/2015 | Fahim | G06F 9/4881 718/102 |
| 2015/0372937 | A1* | 12/2015 | Lai | H04L 47/70 709/226 |
| 2016/0077870 | A1* | 3/2016 | Pho | G06F 9/4881 718/103 |
| 2017/0272494 | A1* | 9/2017 | Huen | G06F 3/0679 |
| 2019/0205236 | A1* | 7/2019 | Combs | G06F 11/3419 |
| 2020/0278886 | A1* | 9/2020 | Blake | G06F 9/5027 |
| 2022/0193558 | A1* | 6/2022 | Larson | A63F 13/355 |
| 2024/0095065 | A1* | 3/2024 | Goodman | G06F 9/4881 |
| 2024/0104683 | A1* | 3/2024 | Nikam | G06T 1/20 |

OTHER PUBLICATIONS

Ju et al., "Proactive Autoscaling for Edge Computing Systems with Kubernetes," Proceedings of the 14th IEEE/ACM International Conference on Utility and Cloud Computing Companion, 2021, 8 pages.

Rossi et al., "Horizontal and Vertical Scaling of Container-based Applications using Reinforcement Learning," Proceedings of the 2019 IEEE International Conference on Cloud Computing, 2019, 10 pages.

Ray et al., "Horizontal Auto-Scaling for Multi-Access Edge Computing Using Safe Reinforcement Learning," ACM Transactions on Embedded Computing Systems, vol. 20, 2021, 33 pages.

Moreno et al., "HeDPM: load balancing of linear pipeline applications on heterogeneous systems," The Journal of Supercomputing, vol. 73, 2017, pp. 3738-3760.

Mastoras et al., "Load-balancing for load-imbalanced fine-grained linear pipelines," Parallel Computing, vol. 85, 2019,pp. 178-189.

Bienia et al., "Characteristics of Workloads Using the Pipeline Programming Model," International Symposium on Computer Architecture, Jun. 2010, 7 pages.

Furst et al., "Elastic Services for Edge Computing," 14th International Conference on Network and Service Management, Nov. 2018, 5 pages, retrieved from https://www.researchgate.net/publication/331651737_Elastic_Services_for_Edge_Computing.

De Assununcao et al., "Distributed Data Stream Processing and Edge Computing: A Survey on Resource Elasticity and Future Directions," arXiv preprint submitted to Elsevier, Dec. 2018, 24 pages, retrieved from https://arxiv.org/pdf/1709.01363.pdf.

Ju, L. "Proactive Autoscaling for Edge Computing Systems with Kubernetes," Uppsala Universitet, Department of Information Technology, Sep. 2021, 49 pages.

Wikipedia, "pcap," Wikipedia, 2022, 6 pages, retrieved from https://en.wikipedia.org/wiki/Pcap.

Kubernetes, "Pods," Kubernetes Documentation, 2022, 7 pages, retrieved from https://kubernetes.io/docs/concepts/workloads/pods/.

Wikipedia, "Apache Kafka," Wikipedia, 2022, 5 pages, retrieved from https://en.wikipedia.org/wiki/Apache_Kafka.

Wikipedia, "Edge device," Wikipedia, 2022, 2 pages, retrieved from https://en.wikipedia.org/wiki/Edge_device.

Kubernetes, "Deployments," Kubernetes Documentation, 2022, 15 pages, retrieved from https://kubernetes.io/docs/concepts/workloads/controllers/deployment/.

Kubernetes, "StatefulSets," Kubernetes Documentation, 2022, 8 pages, retrieved from https://kubernetes.io/docs/concepts/workloads/controllers/deployment/.

Wikipedia, "Instruction pipelining," Wikipedia, 2022, 8 pages, retrieved from https://en.wikipedia.org/wiki/Instruction_pipelining#:~:text=To%20the%20right%20is%20a,%2C%20execute%20and%20write%2Dback.

Wikipedia, "Pipeline (computing)," Wikipedia, 2022, 6 pages, retrieved from https://en.wikipedia.org/wiki/Pipeline_(computing)#:~:text=In%20computing%2C%20a%20pipeline%2C%20also,or%20in%20time%2Dsliced%20fashion.

Abbassi Puja. "Vertical autoscaling in Kubernetes", Giant Swarm, May 4, 2021, 10 pages.

Donnell Bob O. "IBM Research Tech Makes Edge AI Applications Scalable", LinkedIn, Aug. 10, 2022, 6 pages.

No Author. "Dynamically modify the resource parameters of a pod", Alibaba Cloud, Dec. 9, 2024, 8 pages.

\* cited by examiner (a) $$R_n = \frac{Lag_{n+1}}{Lag_n}$$

(b) $$R_n = \frac{2*Lag_{n+1} + Lag_{n+2}}{3*Lag_n}$$

(c) $$R_n = \frac{Lag_{n-1} + Lag_{n+1}}{2*Lag_n}$$

(d) $$R_n = \frac{4*Lag_{n+1} + 2*Lag_{n+2} + Lag_{n+3}}{7*Lag_n}$$

(e) $$R_n = \frac{Lag_{n-2} + 2*Lag_{n-1} + 2*Lag_{n+1} + Lag_{n+2}}{6*Lag_n}$$

FIG. 8

PREVENTION OF RESOURCE STARVATION ACROSS STAGES AND/OR PIPELINES IN COMPUTER ENVIRONMENTS

BACKGROUND

The present invention relates to computing resource monitoring and resource starvation avoidance, and more specifically, this invention relates to detecting starvation of stages of a pipeline and/or across pipelines, as well as methodology for avoiding such starvation in response to detecting indications of starvation.

In computing, a pipeline is a set of data processing stages connected in series, where the output of one stage is the input of the next stage. The stages of a pipeline are often executed in parallel or in time-sliced fashion. Some amount of buffer storage is often inserted between stages.

Stages of a pipeline may run Pods of a known type. In general, a Pod usually refers to a group of one or more containers, with shared storage and network resources, and a specification for how to run the containers. A Pod's contents are co-located and co-scheduled, and run in a shared context. A Pod models an application-specific "logical host": it contains one or more application containers which are relatively tightly coupled. For example, Pods in a Kubernetes cluster are used in two main ways: Pods that run a single container and Pods that run multiple containers that need to work together. The "one-container-per-Pod" model is the most common Kubernetes use case; in this case, a Pod can be thought of as a wrapper around a single container; Kubernetes manages Pods rather than managing the containers directly. In the second model, a Pod can encapsulate an application composed of multiple co-located containers that are tightly coupled and need to share resources. These co-located containers form a single cohesive unit of service—for example, one container serving data stored in a shared volume to the public, while a separate 'sidecar' container refreshes or updates those files. The Pod wraps these containers, storage resources, and an ephemeral network identity together as a single unit.

In some cases, each stage may independently allocate resources dynamically according to the needs of that stage. An autoscaler, such as a Kubernetes HorizontalPodAutoscaler (HPA) or the like, may be used to automatically update a workload resource, with the aim of dynamically (automatically) scaling the workload to match demand. Vertical scaling assigns more resources (e.g., memory, CPU, etc.) to the instances already running for the workload. Horizontal scaling deploys more instances (e.g., containers, replicas of Pods, Virtual Machines (VMs), etc.). If the load decreases, and the number of Pods is above the configured minimum, the autoscaler instructs the workload resource (e.g., the Deployment, StatefulSet, or other similar resource) to scale back down. There are typically multiple independent autoscalers in a pipeline.

In cloud-based pipeline implementations, available resources can be dynamically increased, such as by using a cluster autoscaler to increase nodes within a cluster, or across hyperscalers as in sky computing. Accordingly, the total of available resources (computational budget) in the cloud is often essentially unlimited.

Scaling is currently done using a heuristic algorithm for linear pipelines, and linear programming for multipath pipelines. The phases in a pipeline work independently and resource usage is controlled by statically setting the requests and limits, and by priority scheduling where each phase is given a priority and the process with the highest priority is executed first and others are executed according to priorities. The longer processes with relatively lower priority tend to keep getting throttled and hence priority scheduling undergoes starvation as only higher priority processes execute quickly and those with lower priority tend to remain waiting. Some systems also employ a scheme where aging increases the priority of lower priority programs, allowing them to continue to stay alive alongside relatively higher priority processes. These techniques seem to work well in a cloud-based pipeline processing environment. However, these techniques do not work for edge deployments where resources are limited and the overall latency from input to output are important for a batch of data.

An edge system is different than a cloud-based system, in that an edge system may be as small as a single computer or larger with multiple nodes (e.g., computers) in a cluster, but the number of nodes is fixed, and thus the corresponding amount of resources available for processing is also fixed. In edge environments with limited resources on the devices, all stages (also referred to as phases) of a pipeline running on the edge device(s) are generally limited to the resources within the edge location. Moreover, the throughput of a pipeline is determined by the slowest stage. The total of available resources (computational budget) cannot be dynamically increased as it can be in the cloud.

While pipelines running in edge environments may use autoscalers for each phase to estimate the number of pods and adjust the number of replicas to handle more/less requests in an effort to ensure the smooth operation of that phase, given the finite computational budget in an edge system, manually setting thresholds for each deployment is error prone and difficult. Moreover, reaction time (e.g., hysteresis—lag time) for each autoscaler is different. For instance, a quick reaction is desired, but fluctuation in usage may cause thrashing/flapping, resulting in errors.

Moreover, again given the finite computational budget, some phases may dominate the use of resources. This results in fewer resources for other phases, effectively starving other stages, where "starvation" generally refers to an imbalance between multiple stages in a pipeline or across pipelines, which is often the result of a lack of sufficient computational resources for a given stage or given pipeline, resulting in an increase in overall lag time for that stage or pipeline. Starvation may result in the indefinite postponement of a process because it requires some resource before it can run, but the resource, though available for allocation, is never allocated to this process, often due to higher priority processes preempting lower priority processes.

Starvation is usually caused by an overly simplistic scheduling algorithm. For example, if a (poorly designed) multitasking system always switches between the first two tasks while a third never gets to run, then the third task is being starved of CPU time.

When total resource usage is maximized, but a stage cannot keep up with other stages in the pipeline because it is starving, the edge system is deemed to be "not healthy" in steady state.

A domino effect is created where the slowing of the processes in the next phase (or pipeline) with fewer allocated resources causes more resources to be required by the previous phase (or pipeline), thereby creating bottlenecks because of the differences in the computation effort of the pipeline stages. Pods in such pipelines are often terminated, e.g., due to insufficient memory, insufficient CPU, insufficient network bandwidth, etc., because the Pod is resource-starved, which in turn causes the whole pipeline to slow down. In some cases, processing is halted if Pods cannot be restarted, e.g., due to lack of resources overallocated to other stages/pipelines.

FIG. 12 depicts charts of memory usage, CPU usage, Receive Bandwidth and Transmit Bandwidth for a healthy system. Each line in the chart represents a stage in a pipeline. Such system is functioning in a normal manner. Note that the system characteristics associated with each stage do not deviate significantly from one another for the time period shown.

FIG. 13 depicts the same type of charts, but for an unhealthy system. As shown in FIG. 13, every measured parameter is unstable. Moreover, as shown in the CPU usage chart, one stage is dominating CPU resources to the detriment of all others.

Again, the most important inefficiency associated with a pipeline is the load unbalance among stages because the throughput of a pipeline is determined by the slowest stage. The application will have bottlenecks if significant differences among the computational effort of the pipeline stages exist.

What is needed is a way to solve this dynamically and in a way that does not depend exclusively on the application design, but also considers run-time conditions, such as input data with different processing demands and unsteady computational performance. For example, what is needed is a way to make sure that a stage of a pipeline, or one of the pipelines running in parallel with other pipelines, does not take over an inordinate amount of available resources in a way that starves other stages or pipelines. Such a solution should ensure that the resources that are available on these systems are managed in a way that all pipelines continue to run properly.

SUMMARY

A computer-implemented method, in accordance with one aspect of the present invention, includes analyzing timing data for stages in a pipeline running in an edge system for detecting starvation of one or more of the stages in the pipeline. In response to detecting one or more of the stages being starved, starvation avoidance is performed for mitigating the starvation of the starving stage(s).

Given the limited resources of an edge system, and keeping in mind that the throughput of a pipeline is only as fast as its slowest stage, the foregoing method ensures that the stages in the pipeline continue to operate appropriately, and in a manner that does not slow down the entire pipeline.

A computer-implemented method, in accordance with another aspect of the present invention, includes analyzing timing data for pipelines running in parallel in an edge system for detecting starvation of one or more of the pipelines. In response to detecting one or more of the pipelines being starved, starvation avoidance is performed for mitigating the starvation of the starving pipeline(s).

In preferred approaches, analyzing the timing data includes monitoring lag times between stages for a trend of change in one or more of said lag times. In another approach, analyzing the timing data includes monitoring lag ratios calculated from lag times between different sets of stages for changes in said lag ratios, wherein a change in one of the lag ratios over time is indicative of starvation. The lag times and/or ratios, when considering multiple stages, allow fast detection of starvation of a stage, and can also be used to determine how to reallocate resources of the edge system during starvation avoidance, e.g., by changing a number of Pods operating in one or more of the stages.

Again, given the limited resources of an edge system, the foregoing method ensures that pipelines running in parallel continue to operate appropriately, and avoid domination of system resources by another pipeline.

Further aspects of the present invention include a combination of both of the foregoing methods, in which timing data for stages in a pipeline and/or across pipelines in an edge system is analyzed for detecting starvation of one or more of the stages and/or pipelines. Starvation avoidance is performed for mitigating the starvation of the starving stage(s) and/or pipelines in response to detecting one or more of the stages being starved.

Thus, the methodology presented herein enables an edge computing system to process high-data-throughput processes accurately and consistently.

Other aspects of the present invention will become apparent from the following detailed description, which, when taken in conjunction with the drawings, illustrate by way of example the principles of the invention.

BRIEF DESCRIPTION OF THE DRAWINGS

FIG. 8 is a listing of illustrative formulae used for calculating lag ratios, in accordance with one aspect of the present invention.

DETAILED DESCRIPTION

Figure 1:
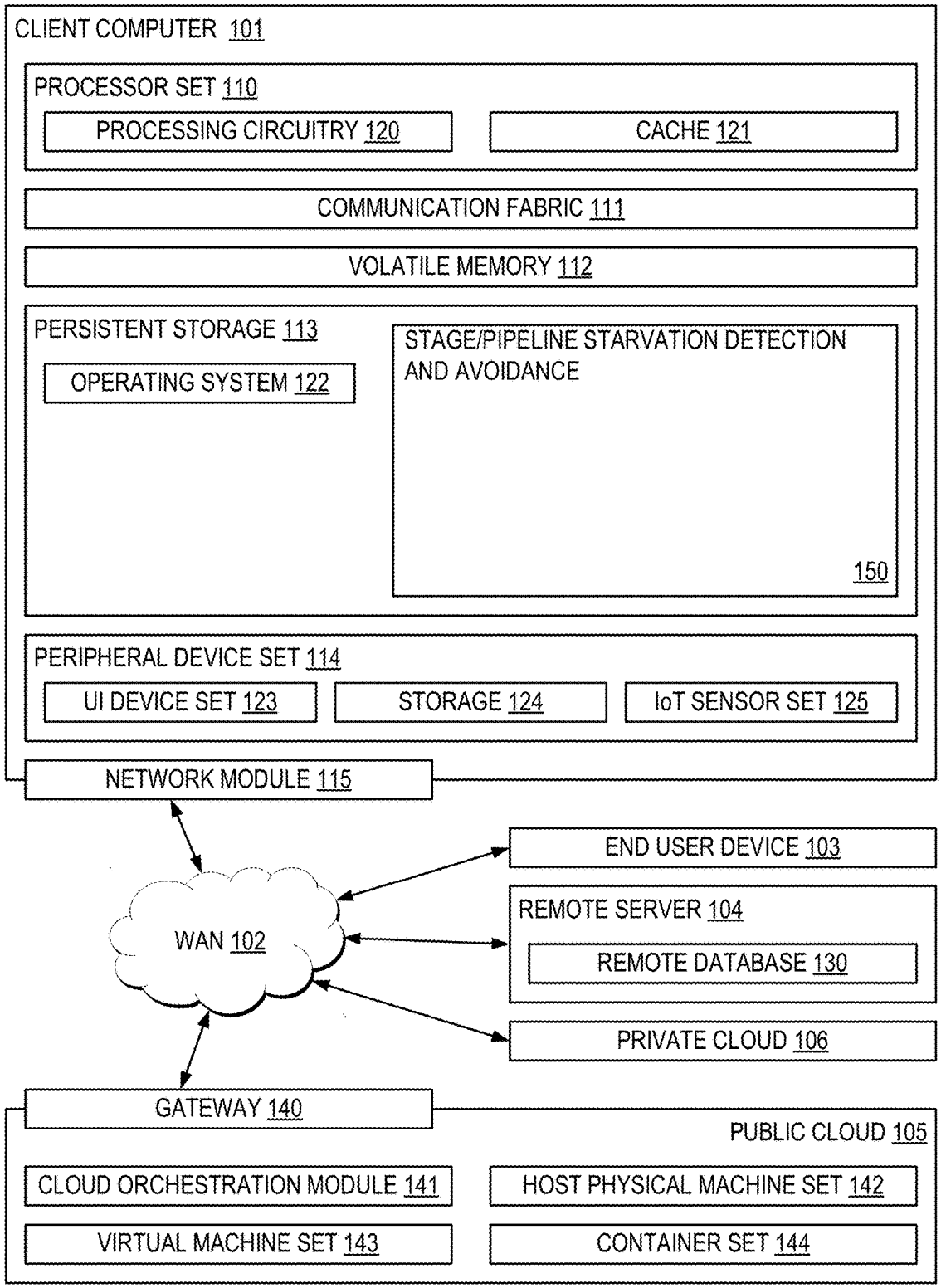
FIG. 1 is a diagram of a computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for detecting starvation of stages of a pipeline and/or across pipelines, as well as methodology for avoiding such starvation in response detecting indications of starvation.

In one general approach, a computer-implemented method includes analyzing timing data for stages in a pipeline running in an edge system for detecting starvation of one or more of the stages in the pipeline. In response to detecting one or more of the stages being starved, starvation avoidance is performed for mitigating the starvation of the starving stage(s).

In another general approach, a computer-implemented method includes analyzing timing data for pipelines running in parallel in an edge system for detecting starvation of one or more of the pipelines. In response to detecting one or more of the pipelines being starved, starvation avoidance is performed for mitigating the starvation of the starving pipeline(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for detecting starvation of stages of a pipeline and/or across pipelines, as well as for avoiding such starvation in response detecting indications of starvation in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various aspects of the present invention may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Various aspects of the present invention may be used in pipeline processing in an edge environment. Any edge environment known in the art may be used. Any reasonable number of pipelines may be operated in parallel in the edge environment. Moreover, each pipeline may have any number of stages.

Figure 2:
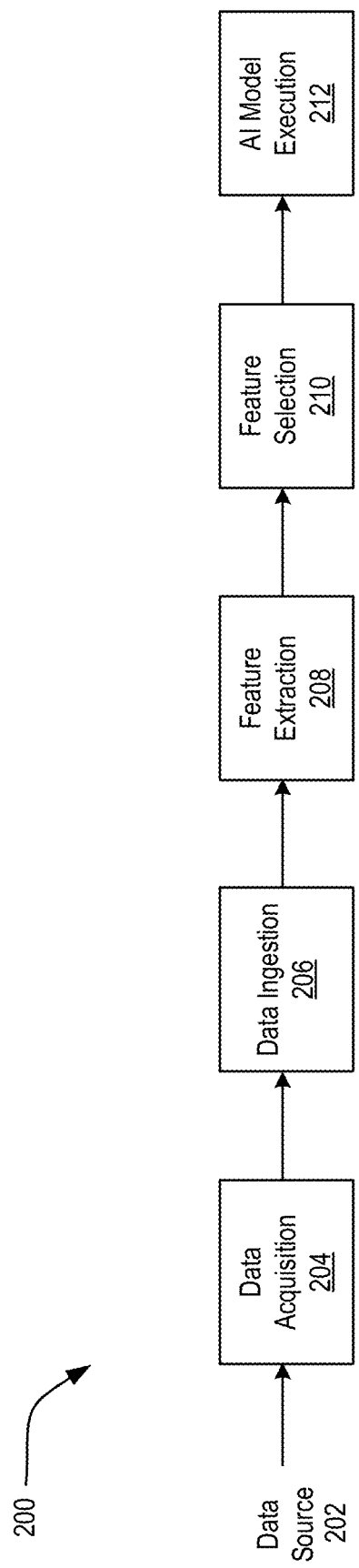
FIG. 2 is a diagram of an illustrative pipeline, in accordance with one aspect of the present invention.

FIG. 2 illustrates an exemplary pipeline 200, in accordance with one aspect of the present invention. The pipeline 200 may include any feature described herein. As shown, information from a data source 202 is supplied to the first stage 204 of the pipeline. The output of the first stage 204 is the input to the second stage 206, and so on for the remaining stages 208-212. The outputs from the various stages may be cached in memory at least until the data is provided to the next stage. However, the system cannot store the data from the stream for too long, because it will either get too stale to be any good for a later analytics stage or it will need to be rotated/overwritten because of limited storage with high-speed ingestion.

Figure 3:
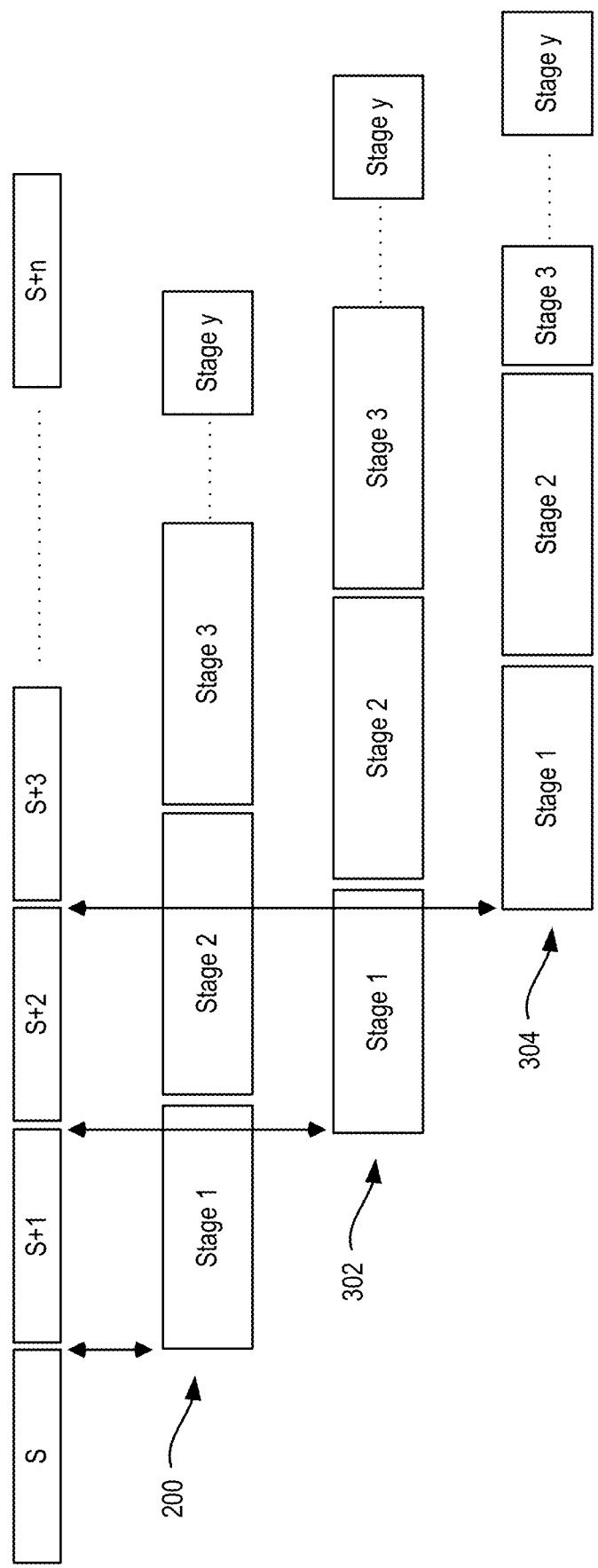
FIG. 3 is a diagram depicting segmentation of an input data stream into segments for parallel processing in multiple pipelines, in accordance with one aspect of the present invention.

FIG. 3 illustrates how data may be processed in parallel pipelines 200, 302, 304. As shown, the input data stream may be divided into segments S, S+1 . . . S+n according to some criterion, e.g., segments of approximately equal size, durational based (e.g., a predetermined number of seconds of the data stream), etc. The first segment S is input to the first pipeline 200, the next segment S+1 is input to the second pipeline 302, segment S+2 is input to the third pipeline 304, and so on for any reasonable number of segments and pipelines, e.g., according to what the edge system can handle. Accordingly, multiple segments of data are processed in parallel. The results of the processing, e.g., the outputs of the pipelines, are then used according to known techniques.

As also shown in FIG. 3, each pipeline includes a series of stages (Stage 1 . . . Stage y) which process the segment of data as it passes through the pipeline. The time it takes for a state to process data is variable, depending on what data is in the segment, the processing techniques (e.g., plugins) used to process the data in that stage, etc.

Figure 4:
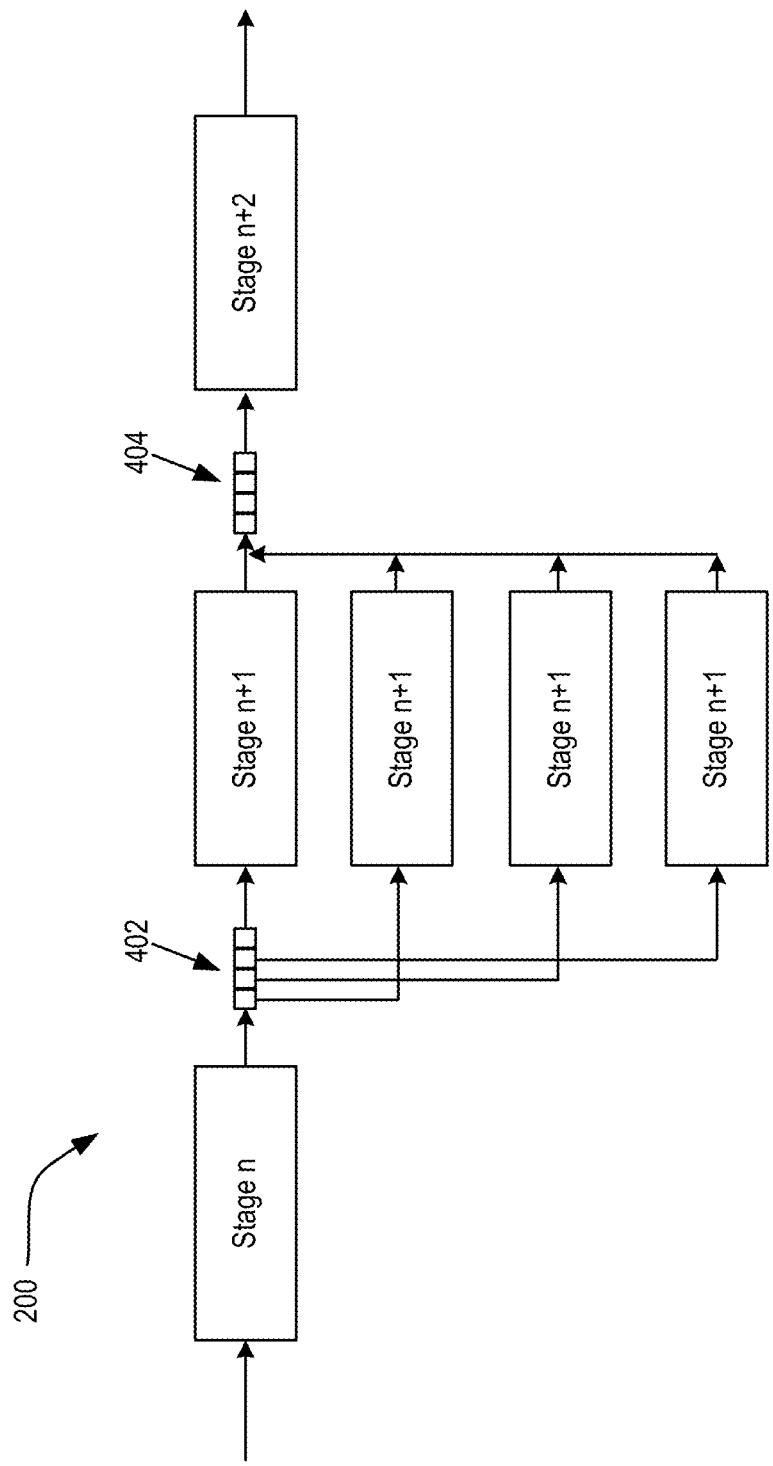
FIG. 4 is a diagram depicting division of output from a stage into segments for processing in parallel in multiple replicas of the next stage, in accordance with one aspect of the present invention.

FIG. 4 illustrates how the output of a stage (stage n) of a pipeline 200 can be further divided into segments (events) 402 and processed in parallel by multiple instances/replicas of the next stage (stage n+1) in the pipeline 200. As shown, the stream of data input to a particular stage may be divided into segments 402 that are then each fed to a unique replica of stage n+1. In preferred approaches, the number of replicas in each stage can be scaled independently. Ideally, the number of replicas chosen for stage n+1 is sufficient to process the data at a rate at which the whole pipeline continues to work without errors or problems, and without any unneeded replicas that would otherwise consume system resources. The outputs of the replicas may then be reconstituted to form an input data stream 404 to the next stage (stage n+2) or may be processed by multiple independent number of replicas of next stage (stage n+2).

As noted above, the most important inefficiency associated with a pipeline is the load unbalance among stages because the throughput of a pipeline is determined by the slowest stage. The application will have bottlenecks if significant differences among the computational effort of the pipeline stages exist.

Various aspects of the present invention are directed to detecting and avoiding starvation of stages in a pipeline and/or across pipelines. Accordingly, at a high level, there are two main portions: starvation detection (analysis), and starvation avoidance (action).

The analysis portion includes the determination and/or analysis of metrics that are relevant to the pipelined nature of the system. In preferred approaches, the detection of lag time between stages is used as a primary metric to determine presence of starvation (and equivalently, presence of over-allocation of resources to a stage and/or a pipeline). In preferred approaches, the objective of the action portion is to balance resources to achieve an approximately constant lag ratio (e.g., within a predefined range of variation) between pipeline stages or across pipelines, thereby avoiding resource starvation and system failure.

Various approaches for resource scaling and/or allocation described herein overcome the drawbacks of the current state of the art, which fails when a constant throughput between pipeline processing stages is required, in particular when some of the stages have resource requirements that are either dynamic or cannot be planned for in advance.

Moreover, various approaches for resource scaling and/or allocation described herein overcome the drawbacks of the current state of the art, by enabling an edge computing system to accurately and consistently process high-data-throughput processes such as pcap processing, RF IQ file processing, image processing and video processing with multiple filters and higher resolutions, etc. The current state of the art has been unable to maintain a stable pipelined process for such high throughput processes due to a variety of factors. For example, when processing pcap files, each pcap file is collected for a period of time (e.g., 10 minutes), and the file may contain a few frames (a few KB) up to a huge number of frames (e.g., 4 GB files). There is high variability on compute resources due to the varying file sizes, and also the processing time required for complex protocols. When congestion occurs, network packets may be lost and lead to model performance issue and reduced accuracy. Similarly, IQ files represent the signal between one or more transmitters and one or more receivers. IQ files may include silence periods (e.g., background noise) or it may include any number of transmissions detected from different user devices communicating with the cell tower. Energy detection algorithms allow the system to identify specific segments in the signal that need further processing. Energy profiles can vary significantly over short periods of times (usually in the millisecond range). When congestion occurs, the analytics often fail because they are not able to keep up with the incoming traffic (currently on the order of 6 to 12 Gbps). The same contributing factors as in the pcap approach need to be addressed in order to maintain the accuracy of the models. As will soon become apparent, various aspects of the present invention overcome these drawbacks to improve the operation, reliability, and throughput of an edge computing system processing one or many pipelines.

In preferred aspects, the methodology presented herein works with stages in pipelines and/or across pipelines to distribute resources from one stage to another within and across pipelines to keep the (multi-modal) pipeline(s) stable. A goal, according to preferred aspects, is to prevent over-allocation of resources to certain stages that may cause deprivation for other stages. To achieve this, each stage may be horizontally and/or vertically scaled to respond to change in demand for that stage. The techniques presented herein are especially useful for pipelines that are highly variable based on the input data, where certain frames (protocols) take longer to process and utilize higher resources (e.g., CPU/memory) than others.

As will soon become apparent, trend lines in lag time and shape of backlog may be used for starvation detection in a pipeline and to detect starvation using lag ratio across multiple stages. In response to detecting starvation, the system mitigates (alleviates) starvation (or equivalently domination) of resource usage for deployments (Pods) across stages to keep the pipelines running smoothly.

Figure 5:
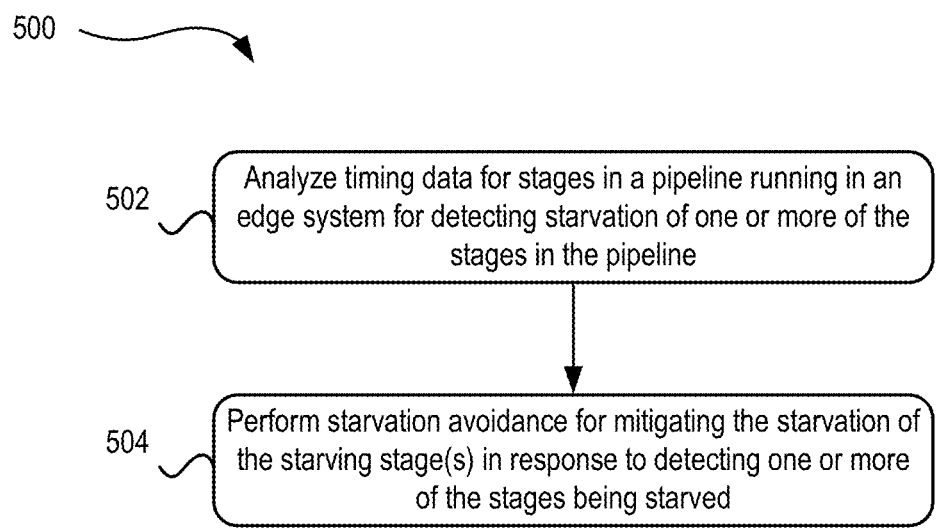
FIG. 5 is a flowchart of a process, in accordance with one aspect of the present invention.

Now referring to FIG. 5, a flowchart of a method 500 is shown according to one approach. The method 500 may be performed in accordance with the present invention in any of the environments depicted in FIGS. 1-4, among others, in various approaches. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by one or more nodes of an edge system, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, which includes analyzing timing data for stages in a pipeline running in an edge system for detecting starvation of one or more of the stages in the pipeline. In operation 504, in response to detecting one or more of the stages being starved, starvation avoidance is performed for mitigating the starvation of the starving stage(s).

The method 500 may be performed at every request, or less frequently, e.g., periodically; at every other request; at every third, fourth, or fifth request; etc.

In one approach, analyzing the timing data includes monitoring lag times between stages for a trend of change in one or more of said lag times, e.g., an increase or decrease over time, an increase or decrease by a predetermined level above or below an average lag time, etc. For example, a trend of an increase in the lag time between first and second stages positioned consecutively in the pipeline, potentially with one or more additional stages therebetween, is detected. In response to detecting the trend, the resource usage of the second stage is increased. Another example includes detecting a trend of a decrease in the lag time between first and second stages positioned consecutively in the pipeline, perhaps with one or more additional stages therebetween, and in response to detecting the trend, decreasing resource usage of the second stage. Lag times may be computed using known methods, such as by counting clock cycles.

Figure 6:
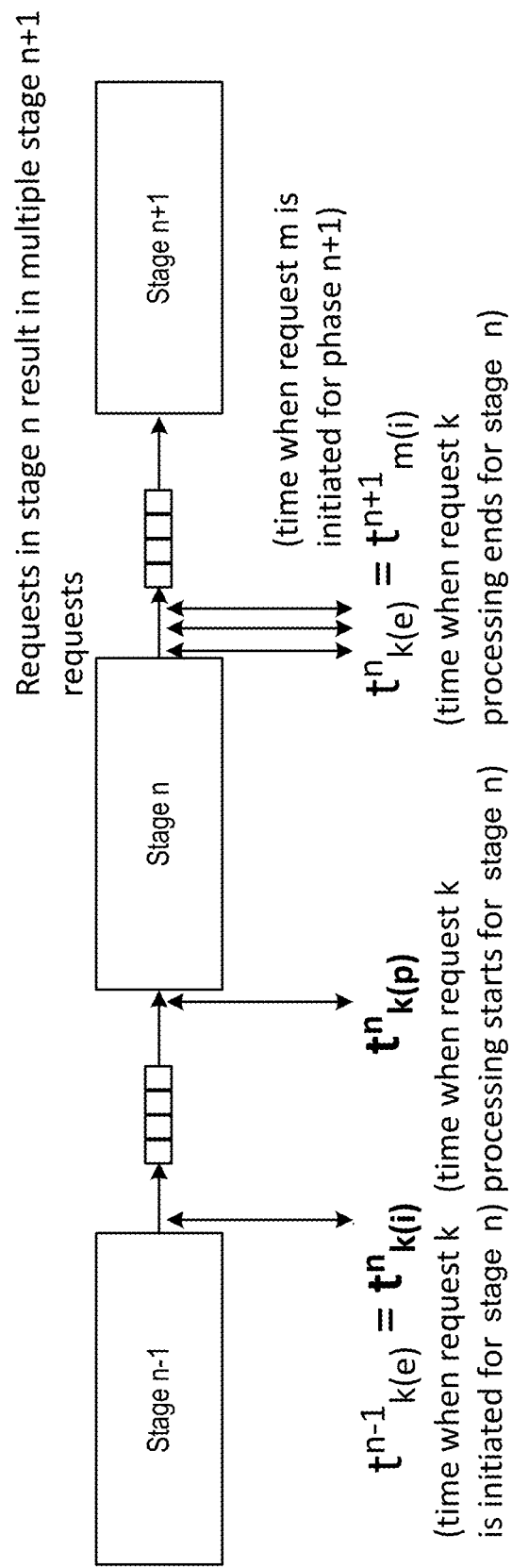
FIG. 6 is a diagram illustrating the concept of lag, in accordance with one aspect of the present invention.

FIG. 6 illustrates the concept of lag for request k between initiation time i and processing start time p and processing end time e for stage n. As shown, lag is calculated according to Equation 1.

$$\text{Lag}_k^n = t_{k(p)}^n - t_{k(i)}^n \qquad \text{Equation 1}$$

The variable $t''_{k(i)}$ is the time when a request k is initiated for stage n. The variable $t''_{k(p)}$ is the time when processing of request k starts in stage n.

Likewise, the lag times for stage n−1 and stage n+1 can be calculated in a similar manner using Equation 1 and the appropriate values. As shown, the processing of request k in stage n (containing a stream of multiple frames) may result in multiple end times e (e.g., e1, e2, e3 and so on corresponding to the multiple frames) with corresponding multiple requests m (e.g., m1, m2, m3, and so on) to the next stage n+1. If stage n+1 has multiple Pods running therein, each Pod may process a portion of request k. Accordingly variable $t''_{k(e)}$ at the output of stage n may use a value corresponding to the maximum value of e, a minimum value of e, an average of the values of e, etc. For calculating lag associated with stage n that includes compute time for stage n, variable $t''_{k(e)}$ can be used instead of the variable $t''_{k(p)}$ in Equation 1.

Other approaches track the $\text{Lag}''_k$ between a request k in stage n and the request m (e.g., the max of m1, m2, m3) in the next stage (or latter stages resulting from k).

The various time values for the stages may be gathered using any known technique that would become apparent to one skilled in the art after reading the present disclosure. In one preferred approach, the application is instrumented to carry the timestamp with identifier and emit metrics. For example, an implementation may use log rotate/sidecar to the application, especially if the application is already logging required information. This approach may include processing time. Another approach may use the lag between the publish and subscribe of Kafka. This approach may not include processing time. A further approach uses monitoring tools such as PROMETHEUS or TELEGRAF for correlation between different stages for corresponding metrics. Ideally, a system health layer is used to intercept the logs, attach a timestamp for the identifier, and perform fast external correlation, caching to compute lag time across stages and/or average response time for webhdfs or object storage requests.

Preferably, starvation for a stage within a pipeline is detected by computing the lag ratio between a current stage and the next stage, and monitoring the lag ratio for changes in the lag ratio, wherein a change in the lag ratio over time is indicative of starvation. Monitoring of lag ratios between all stages is preferred. For example, detecting that the lag ratio keeps increasing is generally indicative that the next stage is lagging more than the current stage. That means the current stage is using more resources. The autoscaler (e.g., HPA) for the current stage may cause a reduction in resource usage in the current stage while the autoscaler in the next stage may increase resource usage in the next stage in an effort to cause the next stage to keep up with the current stage thus reducing the lag time of next stage. Detection that the lag ratio keeps decreasing is indicative of the next stage using more resources and its autoscaler may reduce the resource usage while the resource usage of the current stage is increased (because current stage is slowing down).

Figure 7:
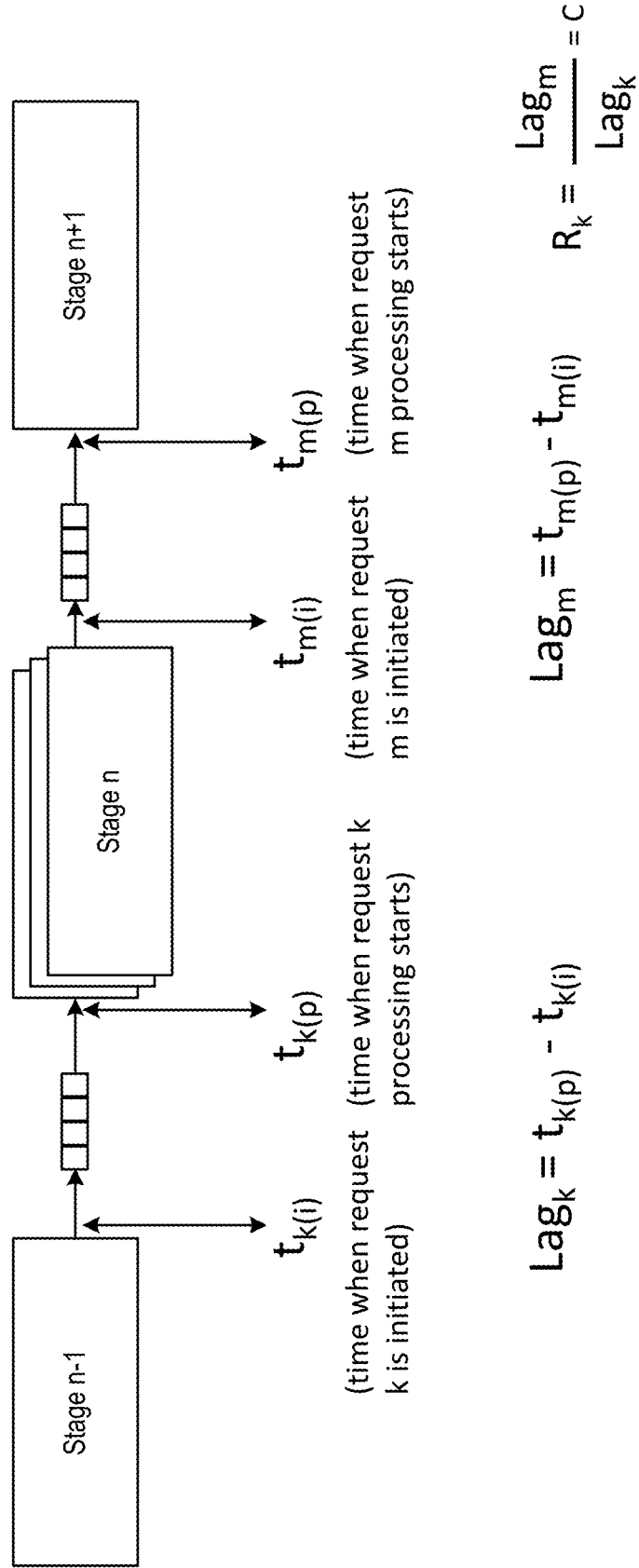
FIG. 7 is a diagram illustrating computation of a lag ratio, in accordance with one aspect of the present invention.

Any known technique for calculating lag ratios may be used. FIG. 7 illustrates an exemplary technique for calculating a lag ratio R between stages. As shown, $\text{Lag}_k$ and $\text{Lag}_m$ e.g., as computed in the manner described with reference to FIG. 6, are used to calculate a lag ratio $R_k$ for stage n according to Equation 2.

$$R_k = \text{Lag}_m / \text{Lag}_k \qquad \text{Equation 2}$$

The $\text{Lag}_K$ and $\text{Lag}_M$ may also be computed as an average lag time of a subset of requests (over a period of time) instead of being computed for each request thus providing an average lag ratio $R_K$. With continued reference to FIG. 7, in an alternate approach for computing lag, the processing end time e may be used instead of the processing start time p.

The goal, in some aspects, is to maintain about a constant lag ratio R between the different stages in the pipeline. Accordingly, in response to detection of an increase in the lag ratio corresponding to first and second stages positioned consecutively in the pipeline (ideally directly consecutive stages, but perhaps with one or more additional stages therebetween), resource usage of the first stage is reduced and/or resource usage of the second stage is increased. Similarly, upon detecting a decrease in the lag ratio corresponding to first and second stages positioned consecutively in the pipeline, resource usage of the first stage is increased and/or resource usage of the second stage is decreased.

As also noted above, ideally, lag ratios of all stages are monitored for changes in any of the lag ratios. If a change is observed, the lag ratio with the largest change may be selected, and a horizontal Pod autoscaler may be instructed to change a number of Pods allocated to at least one of the stages corresponding to said lag ratio for adjusting a performance of the at least one of the stages.

FIG. 8 depicts illustrative formulae used for calculating lag ratios in some approaches. Part (a) illustrates a simple calculation according to Equation 2.

In other approaches, it may be useful to compute the average lag ratio Rn at stage n from multiple stages, while effectively decreasing the weights of lag time (e.g., exponentially) into the past and future stages. Part (b) of FIG. 8 depicts an equation for lag ratio Rn at stage n where the lag time associated with stage n+2 is weighted less than the lag time for stage n+1. Part (c) of FIG. 8 depicts an equation for lag ratio Rn at stage n where the lag times associated with stages n, n+1 and n−1 are used.

Moreover, it may be beneficial to consider lag times from additional stages. This allows for a better determination of how to modify/control the overall system performance. Part (d) of FIG. 8 depicts an equation for lag ratio Rn at stage n that considers lag times at stages n, n+1, n+2 and n+3, where the lag time associated with stage n+2 is weighted less than the lag time for stage n+1, and the lag time associated with stage n+3 is weighted less than the lag time for stage n+2. Part (e) of FIG. 8 depicts an equation for lag ratio Rn at stage n that considers lag times at stages n, n+1, n+2, n−1, and n−2, where the lag time associated with stage n+2 is weighted less than the lag time for stage n+1, and the lag time associated with stage n−2 is weighted less than the lag time for stage n−1.

Of course, the examples shown in FIG. 8 are exemplary only, and other ways of calculating lag ratios that would become apparent to one skilled in the art upon reading the present disclosure may be used.

Referring again to operation 504 of FIG. 5, in which starvation avoidance is performed, any technique for avoiding starvation of one or more stages (and equivalently avoiding overconsumption of resources by one or more of the stages) that would become apparent to one skilled in the art after being apprised of the present disclosure may be used. For example, the resource usage by a stage may be changed horizontally and/or vertically, e.g., by adjusting the amount of processing allocated to the stage, by adjusting the amount of processing power and/or memory allocated to the stage, reallocating or changing (increase/decrease) resources (e.g., replicas by adding/removing Pods) to even out the throughput of the pipeline, etc. Note that scaling in one stage also directly impacts the resources which are available for other stages (or pipelines).

If sufficient resources are not available to create additional instances of Pods for stages, then more and more requests will remain unprocessed, thereby increasing the lag time for those stages. The varying lag time across stages will indicate which stages are being affected. Resource allocations across the pipeline may be adjusted. Preferably, the performance adjustments are applied to evenly degrade performance, if degradation is required to balance the pipeline. The pressure on resources across stages (deployments with Pods) may be approximately equalized, and/or may be based on policies that prioritize tasks/pipelines (e.g., allow one pipeline type/modality to process slower than another).

In one approach, when performing starvation avoidance by changing replicas, the candidates for replica change are preferably handled in order according to the decreasing order of change in lag ratio, thereby selecting stages using too many resources as the first stages to reduce replicas, thereby freeing up computing resources. When the resource usage on an edge node or nodes is maxed out, the candidates for which resource usage is to be reduced are handled first by reducing the number of replicas operating within those candidates, e.g., via one or more autoscalers, to free up resources which can be reallocated to another stage that needs another replica to lower its lag time. When resources on an edge node or nodes are not maxed out, the replicas for candidates selected for increasing resource usage are increased. If increasing resources for a candidate does not work, there is some other bottleneck, then the next candidate is examined.

Further fine grained control may be achieved by changing the resource requests and/or limits for Pods (e.g., with Vertical Pod Autoscaling) when replicas in a deployment cannot be reduced or increased. Note that this may require a restart of the Pod to apply. In some approaches, the stages may need to support reduction or increase of resources to avoid eviction due to overallocation.

In one approach, performing the starvation avoidance includes temporarily suspending operation of at least one of the stages, preferably up to a predefined threshold amount of time. For example, the system may hold back (e.g., exponential backoff with max. backoff time) certain phases of a workload request from executing thus increasing latency but reducing resource usage. This approach is particularly useful when preservation of order when processing/completion is not required.

In another approach, performing starvation avoidance includes holding back a workload request from processing by a stage or the pipeline up to a predefined period of time, to allow the pressure on resources to ease. If the workload request can be initiated within the time period, then the workload is started. If the time runs out, an error may be returned, such as an HTTP 429: Too Many Requests error, so that the request can be resubmitted by the client/previous stage after some time.

In another aspect, performing the starvation avoidance includes reducing a quality of operation of one of the stages for reducing a resource consumption thereof, and allocating more resources to another of the stages. Any type of quality reduction that would become apparent to one skilled in the art after reading the present disclosure may be used. For example, adaptation of workload request in the dominating stage may be performed to lower the quality of its output.

In another aspect, performing the starvation avoidance includes reducing a quality of operation of one of the stages for reducing a resource consumption thereof, and allocating more resources to another of the stages.

In yet another aspect, performing the starvation avoidance includes providing feedback to a host to reduce data acquisition, e.g., the amount of data being fed to the pipeline by the host.

Other ways to perform starvation avoidance include dynamically adapting to the type of data and adjusting to third party plugins/libraries for stages. In another approach, adjustments may be made to Pods running on heterogenous nodes (different processors or nodes that have lowered the clock rate to use less power) that provide different rate of processing, e.g., CPU units used for scheduling differ and can change dynamically.

Figure 9:
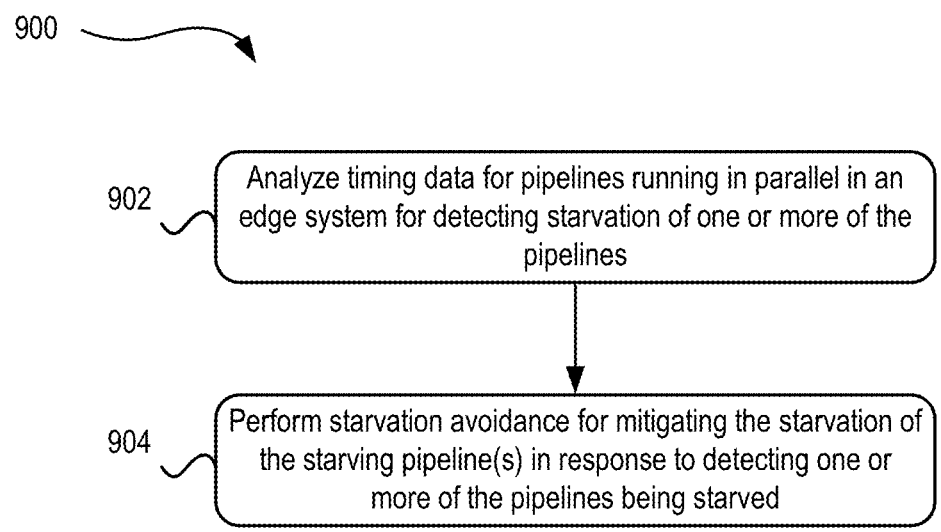
FIG. 9 is a flowchart of a process, in accordance with one aspect of the present invention.

Now referring to FIG. 9, a flowchart of a method 900 is shown, according to one approach. The method 900 may be performed in accordance with the present invention in any of the environments depicted in FIGS. 1-8, among others, in various approaches. Of course, more or fewer operations than those specifically described in FIG. 9 may be included in method 900, as would be understood by one of skill in the art upon reading the present descriptions.

Each of the steps of the method 900 may be performed by any suitable component of the operating environment. For example, in various approaches, the method 900 may be partially or entirely performed by one or more nodes of an edge system, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, which includes analyzing timing data for pipelines running in parallel in an edge system for detecting starvation of one or more of the pipelines relative to the other pipelines. Starvation for a pipeline is the increase in overall lag time of the entire pipeline and/or across multiple stages in the pipeline. For example, in one approach, the lag time for a pipeline is computed as the sum of the lag times for all stages belonging to the pipeline over a subset of requests. In operation 904, in response to detecting one or more of the pipelines being starved, starvation avoidance is performed for mitigating the starvation of the pipeline(s).

Any of the techniques described hereinabove for detecting and avoiding starvation at the stage level may be adapted for use in detecting and avoiding starvation of one or more pipelines in a group of pipelines running in parallel by applying such techniques at the pipeline level, as would become apparent to one skilled in the art after reading the present disclosure. Note that the pipeline level is deemed to include the entire pipeline, as well as portions thereof having multiple stages within the pipeline. Accordingly, operations 902 and 904 may include any feature presented herein, but applied at the pipeline level for detecting and avoiding starvation of a pipeline (or portion thereof) relative to other pipelines running in parallel on the edge system. Likewise, the method 900 may be performed at every request, or less frequently, e.g., periodically; at every other request; at every third, fourth, or fifth request; etc.

For example, analyzing the timing data at the pipeline level may include monitoring lag times across at least a portion of each pipeline for a trend of change in one or more of said lag times, e.g., an increase or decrease in overall lag time for multiple stages in a pipeline, or the entire pipeline, over time; an increase or decrease by a predetermined level above or below an average lag time; etc. In response to detecting a trend of an increase in the lag time across one of the pipelines, resource usage of the pipeline is increased and/or resource usage of another of the pipelines is reduced. For example, Pods may be added to a stage of the pipeline and/or removed from another of the pipelines.

Likewise, analyzing the timing data may include monitoring lag ratios calculated from lag times of different pipelines for changes in said lag ratios, where a change in one of the lag ratios over time is indicative of starvation. In response to detecting an increase in the lag ratio corresponding to first and second pipelines, resource usage of the first pipeline may be reduced and/or resource usage of the second pipeline may be increased. Likewise, in response to detecting a decrease in the lag ratio corresponding to first and second pipelines resource usage of the first pipeline may be increased and/or resource usage of the second pipeline may be decreased. Changes in the lag ratios may be monitored, the lag ratio with the largest change selected, and a horizontal Pod autoscaler instructed to change a number of Pods allocated to one or more stages of one or more of the pipelines corresponding to the ratio for adjusting performance of the one or more pipelines corresponding to the ratio.

Figure 10:
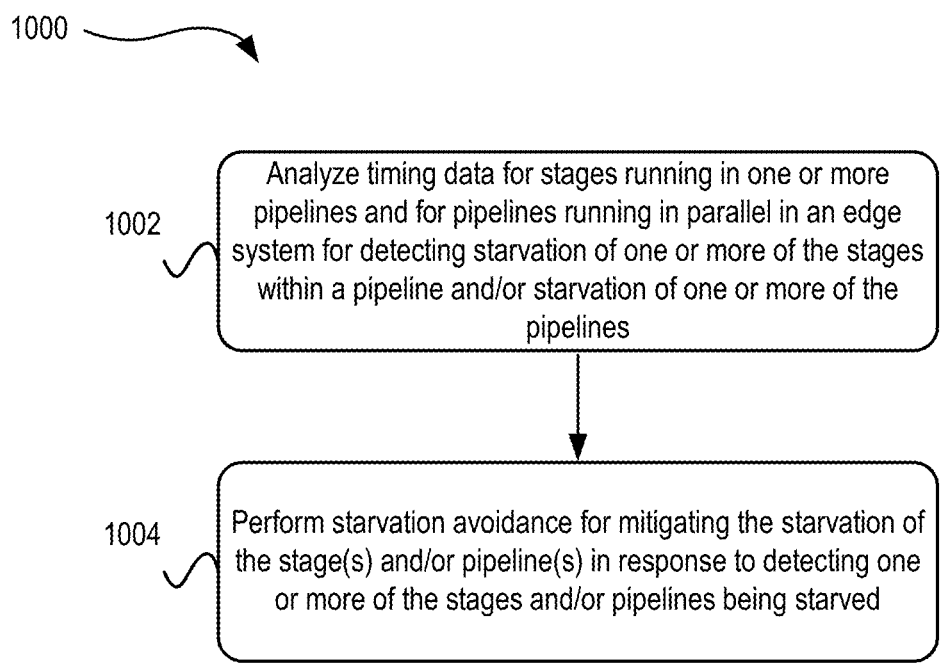
FIG. 10 is a flowchart of a process, in accordance with one aspect of the present invention.

Various aspects of the present invention may include detecting and avoiding starvation in both stages and across pipelines, e.g., both method 500 and method 1000 are performed and/or merged to provide at least some of the benefits of each method. Referring to FIG. 10, a flowchart of a method 1000 is shown, according to one approach. The method 1000 may be performed in accordance with the present invention in any of the environments depicted in FIGS. 1-9, among others, in various approaches. Of course, more or fewer operations than those specifically described in FIG. 10 may be included in method 1000, as would be understood by one of skill in the art upon reading the present descriptions.

Each of the steps of the method 1000 may be performed by any suitable component of the operating environment. For example, in various approaches, the method 1000 may be partially or entirely performed by one or more nodes of an edge system, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, which includes analyzing timing data for stages in one or more pipelines, as well as for pipelines running in parallel in an edge system for detecting starvation of one or more of the stages within a pipeline and/or starvation of one or more of the pipelines relative to the other pipelines. In operation 1004, in response to detecting one or more of the stages and/or pipelines being starved, starvation avoidance is performed for mitigating the starvation of the stage(s) and/or pipeline(s).

Any of the techniques described hereinabove for detecting and avoiding starvation at the stage and/or pipeline level may be adapted for use in method 1000, as would become apparent to one skilled in the art after reading the present disclosure.

Figure 11:
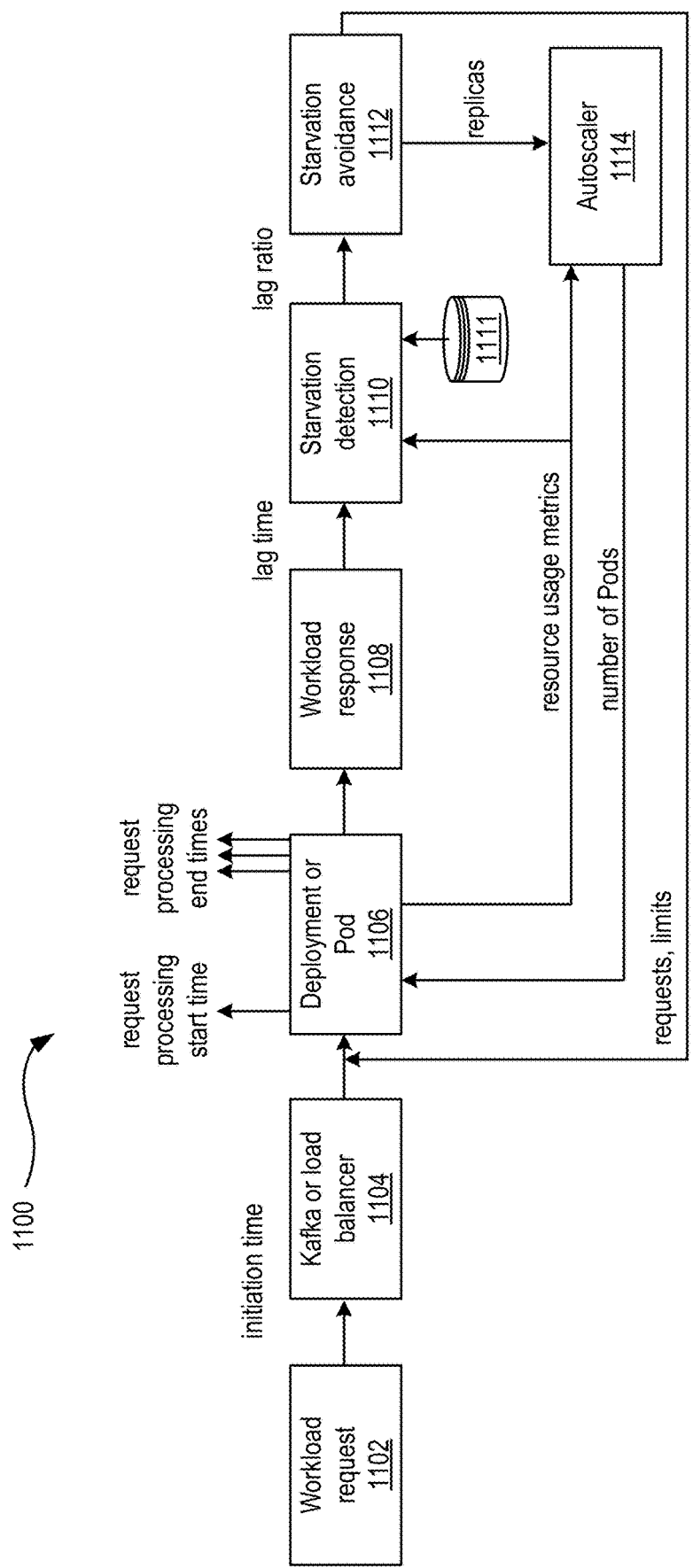
FIG. 11 is a diagram of system, in accordance with one aspect of the present invention.
Figure 12:
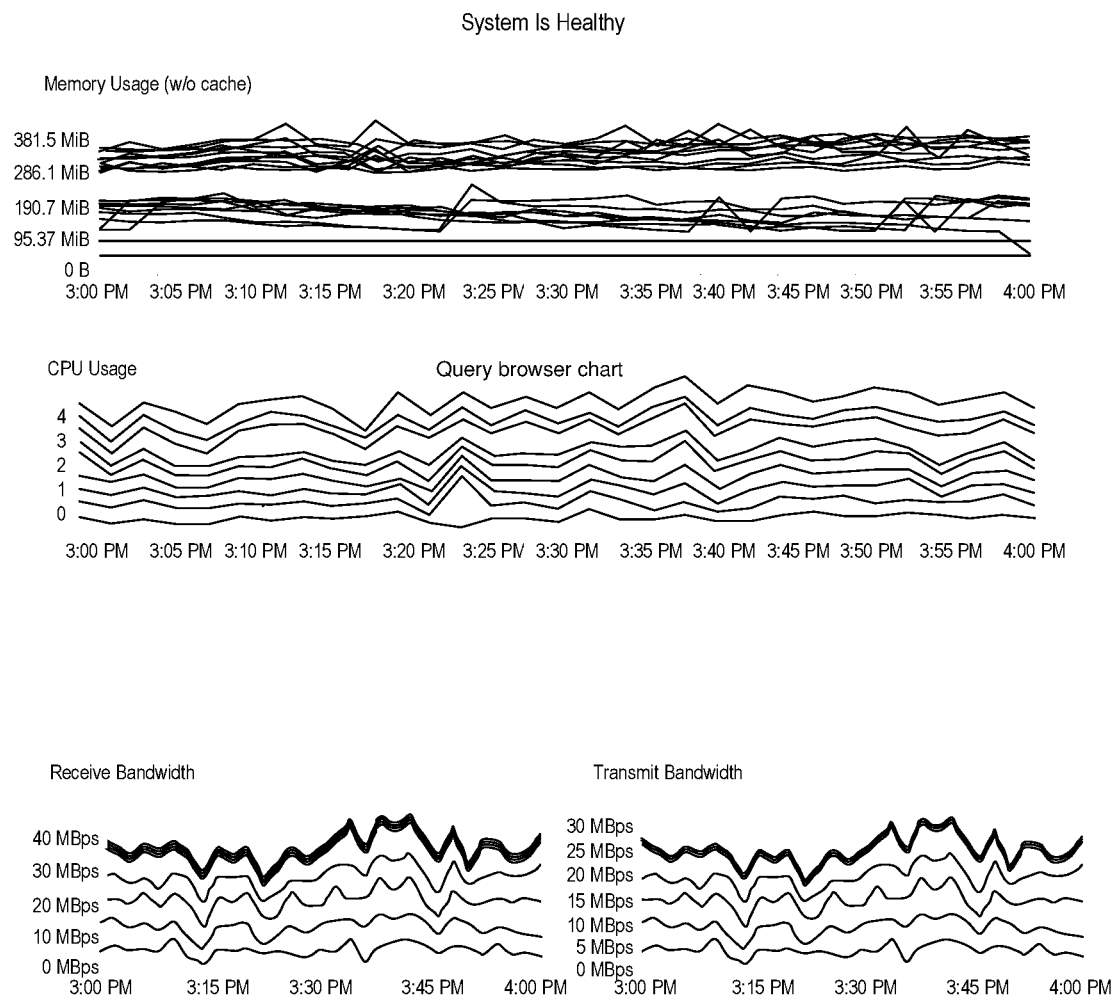
FIG. 12 is a series of performance charts depicting a healthy system.
Figure 13:
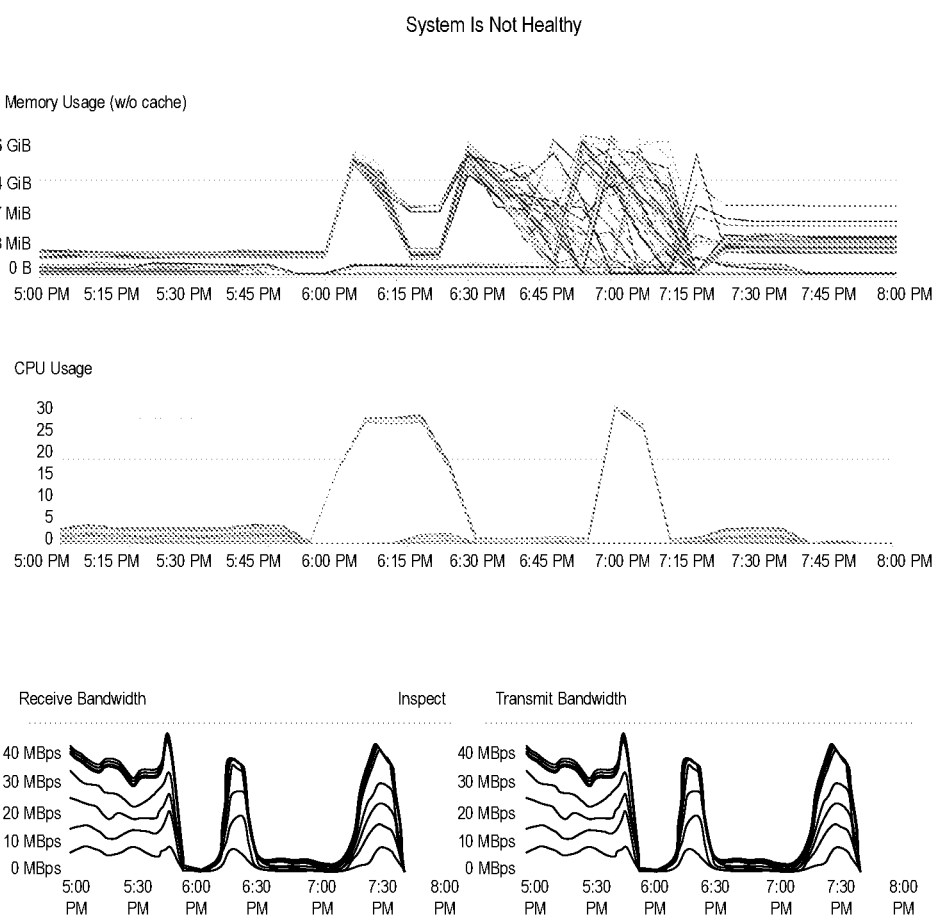
FIG. 13 is a series of performance charts depicting a system that is not healthy.

FIG. 11 depicts a system 1100 for detecting and avoiding starvation of a stage in a pipeline and/or of a pipeline across pipelines, in accordance with one aspect of the present invention. As an option, the present system 1100 may be implemented in conjunction with features from any other approach listed herein, such as those described with reference to the other FIGS. Of course, however, such system 1100 and others presented herein may be used in various applications and/or in permutations which may or may not be specifically described in the illustrative approaches listed herein. Further, the system 1100 presented herein may be used in any desired environment.

The system 1100 may be deployed on an edge-based computing platform of any type. As shown, system 1100 includes a load balancer 1104 that receives a workload request from a workload request module 1102, and passes the request to a deployment or Pod module 1106 for processing. A load balancer or a messaging system such as Kafka 1104 may be used to buffer and distribute requests for processing. The output of module 1106 is received by workload response module 1108 for return to a host or further processing. A starvation detection module 1110 collects resource usage metrics for Pods, e.g., from module 1106, and determines whether any of the stages (or pipelines) are starving, e.g., due to an imbalance across one or more stages. The starvation detection module 1110 may employ a knowledge base artificial intelligence (AI) model to detect starvation, e.g., based on information from the knowledge base 1111.

If starvation is detected, the starvation avoidance module 1112 instructs an autoscaler 1114 to create/remove replicas from the affected stage(s). Note that the autoscaler also performs its usual tasks during operation of the pipeline, such as distributing and autoscaling workloads. The starvation avoidance module 1112 may also attempt other ways to avoid starvation, such as requesting a delay in processing by a stage, requesting that a host slow a data transfer rate, and other techniques described elsewhere herein.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
receiving a workload request for executing a workload in a pipeline running in an edge system;
executing the workload in a plurality of stages of the pipeline according to a level of quality, wherein each stage of the plurality of stages is associated with respective timing data; and
in response to one or more of the stages of the pipeline being starved during the executing based on the respective timing data, mitigating the starvation of the one or more starving stages, wherein the mitigating comprises adapting the workload request to reduce resource consumption of a dominating stage of the plurality of stages by reducing the level of quality of output of the dominating stage and providing resources to at least one of the one or more starving stages, and wherein the dominating stage consumes the most resources relative to the other stages of the pipeline during the executing.

2. The computer-implemented method of claim 1, wherein the timing data includes lag times between the plurality of stages associated with a trend of change in one or more of said lag times.

3. The computer-implemented method of claim 2, further comprising:
responsive to an increase in a lag time between a first stage and a second stage positioned consecutively in the pipeline, increasing resource usage of the second stage.

4. The computer-implemented method of claim 2, further comprising:
responsive to a decrease in a lag time between a first stage and a second stage positioned consecutively in the pipeline, decreasing resource usage of the second stage.

5. The computer-implemented method of claim 1, wherein a change in one of a plurality of lag ratios over time is indicative of the starvation, and wherein the plurality of lag ratios is based on lag times between different sets of stages of the pipeline.

6. The computer-implemented method of claim 5, further comprising:
responsive to an increase in a lag ratio corresponding to a first stage and a second stage positioned consecutively in the pipeline, reducing resource usage of the first stage and/or increasing resource usage of the second stage.

7. The computer-implemented method of claim 5, further comprising:
responsive to a decrease in a lag ratio corresponding to a first stage and a second stage positioned consecutively in the pipeline, increasing resource usage of the first stage and/or decreasing resource usage of the second stage.

8. The computer-implemented method of claim 5, further comprising:
adjusting a performance of at least one stage corresponding to a log ratio of a plurality of log ratios with a largest change by instructing a horizontal Pod autoscaler to scale at least one Pod allocated to the at least one stage.

9. The computer-implemented method of claim 1, wherein mitigating the starvation further includes scaling at least one Pod operating in one or more of the stages.

10. The computer-implemented method of claim 1, wherein mitigating the starvation further includes temporarily suspending operation of at least one of the stages.

11. The computer-implemented method of claim 1, wherein mitigating the starvation further includes holding back a workload request from processing by the pipeline up to a threshold amount of time.

12. The computer-implemented method of claim 1, wherein mitigating the starvation further includes employing a knowledge base artificial intelligence model.

13. A system comprising:
a processor; and
one or more computer readable storage media comprising program instructions collectively stored on the one or more computer readable storage media, the program instructions when executed by the processor execute a method comprising:
receiving a workload request for executing a workload in a pipeline running in an edge system;
executing the workload in a plurality of stages of the pipeline according to a level of quality, wherein each stage of the plurality of stages is associated with respective timing data; and
in response to one or more of the stages of the pipeline being starved during the executing based on the respective timing data, mitigating the starvation of the one or more starving stages, wherein the mitigating comprises adapting the workload request to reduce resource consumption of a dominating stage of the plurality of stages by reducing the level of quality of output of the dominating stage and providing resources to at least one of the one or more starving stages, and wherein the dominating stage consumes the most resources relative to the other stages of the pipeline during the executing.

14. The system of claim 13, wherein the timing data includes lag times between the plurality of stages associated with a trend of change in one or more of said lag times.

15. The system of claim 14, wherein the method further comprises:
responsive to an increase in a lag time between a first stage and a second stage positioned consecutively in the pipeline, increasing resource usage of the second stage.

16. The system of claim 13, wherein a change in one of a plurality of lag ratios over time is indicative of the starvation, and wherein the plurality of lag ratios is based on lag times between different sets of stages of the pipeline.

17. The system of claim 16, wherein the method further comprises:
responsive to an increase in a lag ratio corresponding to a first stage and a second stage positioned consecutively in the pipeline, reducing resource usage of the first stage and/or increasing resource usage of the second stage.

18. The system of claim 16, wherein the method further comprises:
adjusting a performance of at least one stage corresponding to a log ratio of a plurality of log ratios with a largest change by instructing a horizontal Pod autoscaler to scale at least one Pod allocated to the at least one stage.

19. The system of claim 13, wherein mitigating the starvation further includes scaling at least one Pod operating in one or more of the stages.

20. A computer program product, the computer program product comprising:
- one or more computer readable storage media and program instructions collectively stored on the one or more computer readable storage media, the program instructions comprising program instructions to:
  - receive a workload request for executing a workload in a pipeline running in an edge system;
  - execute the workload in a plurality of stages of the pipeline according to a level of quality, wherein each stage of the plurality of stages is associated with respective timing data; and
  - in response to one or more of the stages of the pipeline being starved during the execution based on the respective timing data, mitigate the starvation of the one or more starving stages, wherein the mitigating comprises adapting the workload request to reduce resource consumption of a dominating stage of the plurality of stages by reducing the level of quality of output of the dominating stage and providing resources to at least one of the one or more starving stages, and wherein the dominating stage consumes the most resources relative to the other stages of the pipeline during the execution.

* * * * *